(12) United States Patent
Barkved et al.

(10) Patent No.: US 9,348,045 B2
(45) Date of Patent: May 24, 2016

(54) FIELD CORRELATION FOR REAL-TIME PASSIVE SEISMIC SURVEILLANCE

(75) Inventors: Olav Inge Barkved, Joerpeland (NO); Joseph Anthony Dellinger, Houston, TX (US); John Etgen, Houston, TX (US)

(73) Assignees: BP Corporation North America Inc., Houston, TX (US); BP Norge AS, Stavanger (NO)

( * ) Notice: Subject to any disclaimer, the term of this patent is extended or adjusted under 35 U.S.C. 154(b) by 842 days.

(21) Appl. No.: 13/547,922

(22) Filed: Jul. 12, 2012

(65) Prior Publication Data

US 2013/0028051 A1 Jan. 31, 2013

Related U.S. Application Data

(60) Provisional application No. 61/512,713, filed on Jul. 28, 2011.

(51) Int. Cl.
*G01V 1/36* (2006.01)
*G01V 1/28* (2006.01)

(52) U.S. Cl.
CPC .......... *G01V 1/288* (2013.01); *G01V 2210/123* (2013.01); *G01V 2210/125* (2013.01)

(58) Field of Classification Search
CPC ............ G01V 1/288; G01V 2210/123; G01V 2210/125
USPC .......................................... 367/38, 40, 43, 77
See application file for complete search history.

(56) References Cited

U.S. PATENT DOCUMENTS

| 4,879,558 A * | 11/1989 | Swanson ............. H03M 7/3053 341/123 |
| 5,987,387 A * | 11/1999 | Dickens et al. .................. 702/14 |
| 6,061,299 A | 5/2000 | Grouffal et al. |
| 7,196,969 B1 | 3/2007 | Karazincir |

(Continued)

FOREIGN PATENT DOCUMENTS

| JP | 8-304555 A | 11/1996 |
| WO | 2010080366 A1 | 7/2010 |

OTHER PUBLICATIONS

PCT International Search Report and The Written Opinion of the International Searching Authority issued in application No. PCT/US2012/046517, mailed Jun. 5, 2013, 13 pages.
English Patent Abstract of Japan, Publication No. 08-304555, Publication Date: Nov. 22, 1996, 1 page.

(Continued)

*Primary Examiner* — Daniel L Murphy
(74) *Attorney, Agent, or Firm* — Gunnar Heinisch

(57) ABSTRACT

There is provided herein a method of passive seismic acquisition that utilizes real time or near real time computation to reduce the volume of data that must be moved from the field to the processing center. Much of the computation that is traditionally applied to passive source data can be done in a streaming fashion. The raw data that passes through a field system can be processed in manageable pieces, after which the original data can be discarded and the intermediate results accumulated and periodically saved. These saved intermediate results are at least two, more likely three, orders of magnitude smaller than the raw data they are derived from. Such a volume of data is trivial to store, transport or transmit, allowing passive seismic acquisition to be practically used for continuous near-real-time seismic surveillance.

34 Claims, 3 Drawing Sheets

(56) References Cited

U.S. PATENT DOCUMENTS

| | | |
|---|---|---|
| 2008/0080308 A1 | 4/2008 | Hornby |
| 2008/0219094 A1 | 9/2008 | Barakat |
| 2009/0299637 A1 | 12/2009 | Dasgupta |
| 2010/0054083 A1 | 3/2010 | Stork |
| 2010/0139927 A1 | 6/2010 | Bakulin et al. |

OTHER PUBLICATIONS

Ozdogan Yilmaz, "Seismic Data Processing", Society of Exploration Geophysicists, 1987, chapter 1, pp. 9-81, Tulsa, OK.

Ozdogan Yilmaz, "3-D Seismic Exploration", Society of Exploration Geophysicists, 1987, Chapter 6, pp. 384-427, Tulsa, OK.

\* cited by examiner

FIELD CORRELATION FOR REAL-TIME PASSIVE SEISMIC SURVEILLANCE

RELATED CASE

This application claims the benefit of U.S. Provisional Patent Application Ser. No. 61/512,713 filed on Jul. 28, 2011, and incorporates said provisional application by reference into this disclosure as if fully set out at this point.

TECHNICAL FIELD

This invention relates to the general subject of seismic surveillance and, in particular, to methods for acquiring seismic and other signals that are representative of the subsurface for purposes of seismic exploration and/or surveillance.

BACKGROUND OF THE INVENTION

A seismic survey represents an attempt to image or map the subsurface of the earth by sending sound energy down into the ground and recording the "echoes" that return from the rock layers below. The source of the down-going sound energy might come, for example, from explosions or seismic vibrators on land, or air guns in marine environments. During a seismic survey, the energy source is placed at various locations near the surface of the earth above a geologic structure of interest. Each time the source is activated, it generates a seismic signal that travels downward through the earth. "Echoes" of that signal are then recorded at a great many locations on the surface. Multiple source/recording combinations are then combined to create a near continuous profile of the subsurface that can extend for many miles. In a two-dimensional (2-D) seismic survey, the recording locations are generally laid out along a single line, whereas in a three dimensional (3-D) survey the recording locations are distributed across the surface in a grid pattern. In simplest terms, a 2-D seismic line can be thought of as giving a cross sectional picture (vertical slice) of the earth layers as they exist directly beneath the recording locations. A 3-D survey produces a data "cube" or volume that is, at least conceptually, a 3-D picture of the subsurface that lies beneath the survey area. In reality, though, both 2-D and 3-D surveys interrogate some volume of earth lying beneath the area covered by the survey. Finally, a 4-D (or time-lapse) survey is one that is recorded over the same area at two or more different times. Obviously, if successive images of the subsurface are compared any changes that are observed (assuming differences in the source signature, receivers, recorders, ambient noise conditions, etc., are accounted for) will be attributable to changes in the subsurface.

A seismic survey is composed of a very large number of individual seismic recordings or traces. The digital samples in seismic data traces are usually acquired at 0.002 second (2 millisecond or "ms") intervals, although 4 millisecond and 1 millisecond sampling intervals are also common. Typical trace lengths are 5-16 seconds, which corresponds to 2500-8000 samples at a 2-millisecond interval. Conventionally each trace records one seismic source activation, so there is one trace for each live source-receiver combination. In a typical 2-D survey, there will usually be several tens of thousands of traces, whereas in a 3-D survey the number of individual traces may run into the multiple millions of traces. Chapter 1, pages 9-89, of *Seismic Data Processing* by Ozdogan Yilmaz, Society of Exploration Geophysicists, 1987, contains general information relating to conventional 2-D processing and that disclosure is incorporated herein by reference. General background information pertaining to 3-D data acquisition and processing may be found in Chapter 6, pages 384-427, of Yilmaz, the disclosure of which is also incorporated herein by reference.

An ideal marine seismic source would cover the entire frequency band of interest, and only the frequency band of interest for seismic surveying, i.e., about 1-100 Hz or even higher (e.g., up to 300 Hz) depending on the survey objectives. Swept-frequency sources are of increasing interest as an alternative to conventional sources due to their ability to control the bandwidth of their signal sweep. However, in practice it is very difficult to build a single swept-frequency source that covers this entire range.

Conventional marine seismic sources are located in water and thus only radiate P waves. For some applications other wave modes such as surface waves can also provide valuable information. Surface waves travel horizontally through the shallow sedimentary section, and thus allow imaging of shallow features that may be difficult to image using more vertically traveling P waves. Although P waves generated by conventional marine seismic sources do convert into other wave modes when they pass from water into sediment, they do so only weakly. Ocean-bottom sources have been developed and deployed in an effort to better generate such waves. However, the use of ocean-bottom sources has been very limited because of their high cost of operation.

Low-frequency surface waves have recently shown promise for imaging marine near-surface velocity anomalies, which may represent geohazards such as shallow gas. Low-frequency surface waves are particularly difficult to generate using active marine seismic sources, but are an abundant component of the seismic noise background in shallow-water marine settings.

Thus, interest has turned in recent years to the use of passive seismic surveys which do not utilize a conventional/active seismic source. In a passive survey, the seismic receivers continuously record the ambient seismic signal/noise for a relatively long period of time (e.g., multiple hours, days, etc.). Then, using autocorrelation, cross correlation, or other techniques for performing seismic virtual-source interferometry well known to those of ordinary skill in the art, the data records that contain the generally unintelligible raw data signal can be processed to provide images of the subsurface.

The advantages of such an approach are clear. First, the environmental and logistical impact of such a survey is much less than one that utilizes an active seismic source, which is typically an air gun (in a marine environment) or dynamite or vibrators (in a land survey).

Second, the seismic noise background is often rich in the low frequencies that are difficult to generate using active sources. In a shallow-water marine environment, the low-frequency seismic noise background is particularly rich in surface waves. Virtual-source interferometry of low-frequency surface-wave passive data has recently shown promise for detecting shallow velocity anomalies and/or changes in shear-wave splitting magnitudes and polarizations such as those that might be associated with movements of shallow gas or fluids, or changes in properties of the subsurface such as porosity or its state of stress. Generating such low-frequency surface waves using an active source would conventionally require a large ocean-bottom source, which would typically be infeasible both due to its cost and because of the operational risk of damage to facilities and infrastructure.

Third, the expense of sources, particularly ocean-bottom sources, may also be avoided. Ocean-bottom receivers, which are generally much less expensive to deploy, become virtual ocean-bottom sources.

Finally, with passive data no effort needs to be made to create artificial sources. In principle, data can be recorded continuously for arbitrarily long periods. This is obviously of great benefit if the goal is real-time or near-real-time surveillance.

To create good images from ambient noise alone requires that very large volumes of data be collected. For example, 2000 four-component receivers recording at a sample rate of 2 milliseconds generate 54 gigabytes of data per hour, or one and a quarter Terabytes every day. Experience has shown that a few hours of recording is typically not enough to produce a good image. Ideally, several days' worth of data would be used. Such a volume of data is difficult to store, transport, or transmit, especially on an ongoing basis, which severely limits the usefulness of the method for real-time surveillance. As a result, the oil industry has acquired only a few large passive datasets. Most of the existing datasets only span a few hours, barely long enough to produce a useful result. For continuous surveillance, the datasets are much larger than the examples given above. Continuing the previous example, an array of 2000 four-component receivers recording at a sample rate of 2 milliseconds would generate 459 Terabytes of raw seismic recordings per year.

Another problem is that conventional interferometry requires the noise to be "uniformly distributed". The noise on any given hour or day may or may not be suitably distributed, depending on field operations, ocean conditions, the weather, etc. One solution is to use a dense receiver array that enables any non-uniform distribution to be corrected in processing (e.g., see Stork, Christof, US 2010/0054083, Measuring and modifying directionality of seismic Interferometry data). However, dense receiver arrays are more expensive than sparse ones which tends to limit the usefulness of this technique. A simpler solution is to simply record for a longer period of time since a recording that is acquired over a longer period of time is more likely to have noise that is uniformly distributed.

Heretofore, as is well known in the seismic acquisition and processing arts, there has been a need for a system and method that provides a more efficient method of acquiring and processing passive seismic data that does not suffer from the disadvantages of the prior art. Accordingly, it should now be recognized, as was recognized by the present inventors, that there exists, and has existed for some time, a very real need for a method of seismic data processing that would address and solve the above-described problems.

Before proceeding to a description of the present invention, however, it should be noted and remembered that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

SUMMARY OF THE INVENTION

According to one embodiment, there is provided method of seismic surveillance above a region of the subsurface of the earth containing structural or stratigraphic features conducive to the presence, migration, or accumulation of hydrocarbons, comprising the steps of: (a) accessing a plurality of passive seismic receivers positioned proximate to the region of the subsurface of the earth; (b) continuously recording a signal from each of said plurality of passive seismic receivers at a location proximate to said plurality of receivers for a predetermined period of time, thereby obtaining a plurality of passive seismic recordings; (c) processing in near real time at least a portion of said plurality of passive seismic recordings to produce a plurality of virtual-source gathers in near-real time, wherein said plurality of virtual-source gathers have a storage size that is substantially less than a storage size of said at least a portion of said plurality of passive seismic recordings; (d) transmitting at least a portion of said plurality of virtual-source gathers to a remote processing facility; (e) within said remote processing facility, processing at least a portion of said plurality of virtual source gathers to obtain an image representative of at least a portion of the region of the subsurface of the earth; and, (f) using at least a portion of said image to explore the region of the subsurface of the earth.

According to another embodiment, there is provided a method of seismic surveillance, wherein is provided a plurality of passive seismic receivers situated proximate a subsurface target of exploration or surveillance interest, comprising the steps of: (a) continuously recording a signal from each of said plurality of passive seismic receivers for a predetermined period of time, thereby obtaining a plurality of passive seismic recordings; (b) in a computer situated proximate said plurality of passive seismic receivers, (i) processing in near real time said plurality of seismic recordings to substantially reduce a storage size of said plurality of seismic recordings as compared with a storage size of said plurality of seismic recordings, and, (ii) transmitting at least a portion of said processed plurality of seismic recordings to a remote processing facility via a restricted bandwidth communications link; (c) within said remote processing facility, further processing at least a portion of said transmitted processed seismic recordings to obtain an image representative of at least a portion of the subsurface target; and, (d) using at least a portion of said image to explore the region of the subsurface of the earth.

According to still another embodiment, there is provided method of seismic surveillance above a region of the subsurface of the earth containing structural or stratigraphic features conducive to the presence, migration, or accumulation of hydrocarbons, comprising the steps of: (a) accessing a plurality of passive seismic receivers positioned proximate to the region of the subsurface of the earth; (b) at a location proximate to said plurality of receivers, (b1) continuously recording a signal from each of said plurality of passive seismic receivers for a predetermined period of time, thereby obtaining a plurality of passive seismic recordings, and, (b2) applying a low-pass filter to each of said plurality of passive seismic recordings and decimating each of said plurality of passive seismic recordings by a predetermined factor, thereby producing a plurality of processed seismic traces; (c) transmitting at least a portion of said plurality of processed seismic traces to a remote processing facility; (d) within said remote processing facility, further processing at least a portion of said plurality of processed seismic traces to obtain an image representative of at least a portion of the region of the subsurface of the earth; and, (e) using at least a portion of said image to explore the region of the subsurface of the earth.

In still another embodiment there is provided a method of seismic surveillance above a region of the subsurface of the earth containing structural or stratigraphic features conducive to the presence, migration, or accumulation of hydrocarbons, comprising the steps of: (a) within a processing facility remote from the region of the subsurface of the earth, accessing a plurality of processed seismic traces that have been collected by the steps of: (a1) positioning a plurality of passive seismic receivers proximate to the region of the subsurface of the earth; (a2) continuously recording a signal from each of said plurality of passive seismic receivers for a predetermined period of time, thereby obtaining a plurality of passive seismic recordings, (a3) at a location proximate to said plurality of passive seismic receivers, (i) applying a low-pass filter to each of said plurality of passive seismic recordings and decimating each of said plurality of passive seismic recordings by a predetermined factor, thereby producing a plurality of modified passive seismic traces, (ii) selecting at least one pair of modified passive seismic traces, (iii) calculating a correlation of each of said selected at least one pair of modified passive seismic traces, thereby producing a plurality of processed seismic traces, and, (iv) transmitting said plurality of processed seismic traces from the location proximate to the plurality of passive seismic receivers to the processing facility remote from the region of the subsurface of the earth; (b) using at least a portion of said accessed plurality of seismic traces to obtain an image representative of at least a portion of the region of the subsurface of the earth; and, (c) using at least a portion of said image to explore the region of the subsurface of the earth.

In still further embodiment there is provided a method of seismic surveillance above a region of the subsurface of the earth containing structural or stratigraphic features conducive to the presence, migration, or accumulation of hydrocarbons, comprising the steps of: (a) within a processing center remote from the region of the subsurface of the earth, accessing a plurality of decimated and filtered passive seismic traces that have been collected by the steps of: (a1) positioning a plurality of passive seismic receivers proximate to the region of the subsurface of the earth; (a2) continuously recording a signal from each of said plurality of passive seismic receivers for a predetermined period of time, thereby obtaining a plurality of passive seismic traces, (a3) applying a low pass filter to each of said plurality of passive seismic traces, (a4) decimating by a predetermined factor each of said plurality of passive seismic traces, thereby producing a plurality of decimated and filtered passive seismic traces, and, (a5) transmitting said plurality of decimated and filtered passive seismic traces from a location proximate to the region of the subsurface of the earth to said remote processing facility; (b) using at least a portion of said accessed decimated and filtered passive seismic traces to obtain an image representative of at least a portion of the region of the subsurface of the earth; and, (c) using at least a portion of said image to explore the region of the subsurface of the earth.

The foregoing has outlined in broad terms the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which.

DETAILED DESCRIPTION

Figure 1:
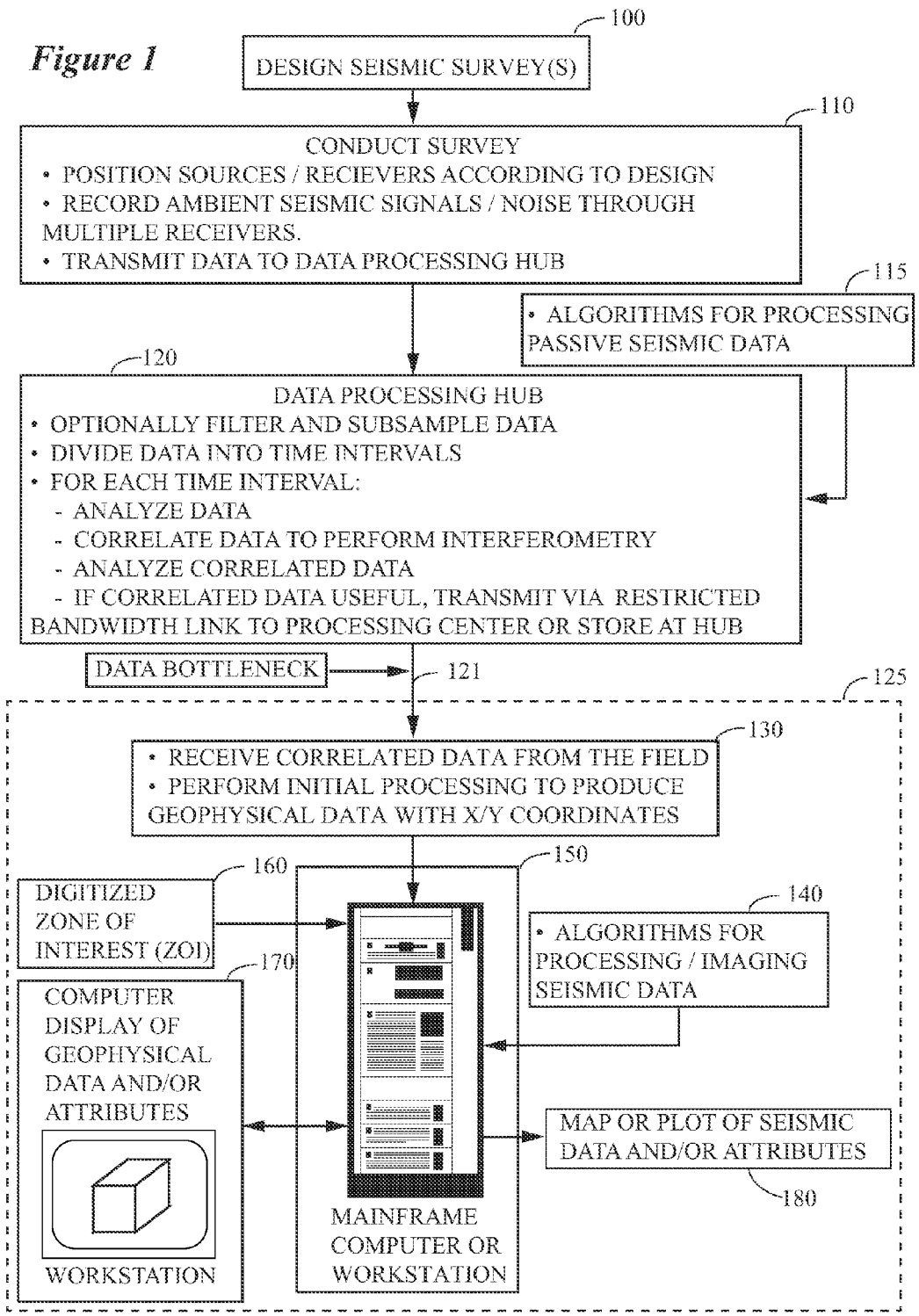
FIG. 1 illustrates the general processing environment of the instant invention.

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

According to one aspect of the instant invention, there is provided a system and method for acquiring passive seismic data that makes it possible to acquire and process such seismic data without transmitting huge volumes of data back to a central processing facility. In general, and as is discussed in greater detail below, the method utilizes in-field (on site) processing to reduce the data volume to a manageable level so that it can be transmitted back to a processing facility on an ongoing basis using only an unobtrusive fraction of the typically available data-transmission links. Because the data after field processing is condensed enough to be transmitted on an ongoing basis, it can be used to monitor changes in the subsurface in near real time. In cases where the limiting factor is data storage space in the processing center, not data transmission links, another embodiment utilizes real-time transmission of the raw data, or of pre-processed data.

In one arrangement, processes such as low-pass filtering and decimation (if desired), directional distribution analysis (if desired), frequency-band analysis (if desired) and cross-correlation (or cross-deconvolution, or any of the other variant methods in use for performing virtual-source interferometry) may be performed on the streaming or buffered passive input data one recording-time period (for example, one hour or one day) at a time, saving the desired outputs, and then discarding the original data. The recording-time periods may be contiguous, or spaced apart, or partially overlapping. The computation may be performed in the field, either in the recording system itself or in a computer system located in the field, or may be performed at a processing center with a real-time or recurring transitory link to the field, or partially in the field and partially in a processing center.

Embodiments of the method may allow for a tremendous reduction in the amount of data needing to be stored, handled, and transmitted from the acquisition site, perhaps on the order of 200× to 3000× or more in some embodiments, depending on the size of the recording-time intervals used and the size of the retained output after correlation. Note that one feature of the instant invention is that, after processing as indicated herein, the original/unprocessed data can be discarded. As indicated above, this can be a tremendous advantage when dealing with passive data.

In one embodiment, the limiting factor may be transmission bandwidth, and the instant invention is designed to perform these sorts of computations in the field, thereby reducing the amount of data that must be transmitted back to the central processing facility.

In another embodiment, the limiting factor may be data storage space, and the instant invention may be designed to perform the computations in a central processing center, thereby reducing the amount of data that must be put into long-term storage.

In another embodiment, some initial processing may be performed in the field, followed by final processing in a central processing center. So, for example, removal of transient high-amplitude noise, low-pass filtering and decimation might be performed off shore, and correlation, analysis and stacking on shore.

In some variations of the instant invention, the real-time automated system that processes the data as collected might also detect when the noise has desirable statistical properties, and avoid processing or saving data that would not be useful for later processing. So, for example, if the noise used to image the features of interest is excited by ocean swell, the system could detect the predominant direction of the ocean swell and immediately reject data from time periods when the predominant swell comes from a direction that is already over-represented in the data.

The data could also be processed and then discarded if the resulting synthesized virtual-source seismograms do not have appropriate statistical properties. Virtual-source seismograms calculated from each time interval of data might also be further processed before being combined to generate a final result. For example, virtual-source gathers might be weighted before summation, possibly in a frequency-dependent manner, so as to optimize a statistical quality measure in the result. Statistical quality measures might include symmetry between positive and negative time lags, relative amplitudes of desired or undesired wave types or artifacts, uniformity of amplitude with azimuth, frequency distribution of the noise background, or any of many other quality measures known to those of ordinary skill in the art.

This strategy would further reduce the data overhead required to archive large amounts of virtual-source data, making it feasible to do on a regular basis. Then, for example, images derived from the virtual-source data could be calculated on a continually recurring basis, and examined for changes. This would enable near-real-time surveillance of the field, for example to look for low-velocity anomalies such as those that would occur because of gas moving toward the surface, or changes in shear-wave splitting caused by changes in the local stress state of the Earth. Note the receiver arrays need not be ocean bottom cables, but might be for example in a borehole or on land.

Further, in another embodiment raw unrotated multicomponent data could be correlated in the field. Conventionally rotation matrices are first determined using active-source data. Passive data are then recorded, rotated using the known matrices to convert the arbitrarily oriented receiver components to North, East, Vertical, and Pressure, and only then are these pre-processed data correlated to make virtual-source seismograms. By correlating as a first step, and saving the (much smaller) auto- and cross-correlations of the raw unrotated components, the necessary rotation matrices can then be determined and applied later. By using virtual sources in place of the traditional active sources, the necessary rotation matrices could be determined even if no active-source data were available.

A more sophisticated solution is to examine the data as it comes in, and only retain data that have desirable statistical properties, either because it is uniformly distributed or because it contains energy of wave types, or from directions, or in frequency bands that would benefit from having additional samples.

The ability to select just the best data to process from an extremely large dataset allows for an improvement in the resulting image quality, which is desirable even if only a single image is required (for exploration) instead of a series of images over time (for surveillance).

EMBODIMENTS

According to an embodiment of the instant invention, there is provided a method of passive seismic acquisition that utilizes real time or near real time processing of passive seismic data as it is acquired in order to substantially reduce the amount of information that needs to be stored and subsequently moved back to the processing center.

The instant invention is broadly motivated by the observation that in order to perform virtual-source interferometry it is not necessary to save all of the data that have been recorded in the field. Instead, according to the instant invention the raw data may be auto- and cross-correlated in real time or in near real time in the field to produce virtual source records. As used herein, "real-time" refers to data processing that appears to take place, or actually takes place, instantaneously upon data acquisition or receipt of data. As used herein, "near real-time" refers to data processing that takes place after some minor or insignificant time delay after data acquisition or receipt of data. The time delay may range, without limitation, from milliseconds to hours to a few days. Only tens of seconds of virtual source records then generally need be kept after such correlation. The many hours of recorded passive input data are no longer needed after the data have been correlated. Thus, a logical place to perform that operation is in the field (or other location(s) to be discussed below), thereby eliminating the need for huge amount of data to be transmitted back to a central processing center only to be briefly used then discarded.

Additionally, and in some embodiments, the raw data may also be beam-formed to analyze the directional distribution of its energy content before transmission. However, after the directional distribution is calculated (which is a relatively small array of numbers), the voluminous original data are again no longer needed.

Likewise, for many applications only low frequencies are required. After low-pass filtering of the raw/input data, it may be decimated, typically by a factor of 25, more or less. At that point, the original data are no longer required. One embodiment of the instant invention utilizes this approach.

Those of ordinary skill in the art will recognize that the processes discussed above are all linear. Thus, they may be performed on a first "interval" of data, then on a second interval of data, etc., with the end product being substantially the same as if the calculation had been performed on both intervals combined into a single longer interval (barring, of course, small edge effects that can typically either be ignored or ameliorated with simple tapering, overlapping windows, a combination of both, etc.).

FIG. 1 illustrates the general acquisition and processing environment in which the instant invention would typically be used. A passive seismic survey may be designed 100 to cover an area of economic or geological interest. Field acquisition parameters (e.g., sample rate, receiver spacing, line spacing, recording time, etc.) are typically selected in conjunction with this step, although it is common to modify the ideal design parameters slightly (or substantially) in the field to accommodate the realities of conducting the survey. The receivers are then deployed 110 with a real-time connection back to a data-collection hub. In a marine setting, the real-time connection might be via an ocean-bottom cable, and the data-collection hub might be subsea, or on a platform, or at a processing center onshore. In a land setting, the real-time connection might instead be via a wireless network, and the data-collection hub might be in the field, or in a control van, or in a structure.

In an embodiment, algorithms for processing raw passive seismic data 115 may be communicated to an in-field data collection hub 120. Within that system, processing steps may take place using the algorithms 115 (and potentially others) to reduce the volume of data that is further transmitted via a restricted bandwidth link to a central processing center 125 as is described below. A program 115 embodying the instant invention might be conveyed into the field computer(s) that is to execute it by means of, for example and without limitation, a floppy disk, a magnetic disk, a magnetic tape, a magneto-optical disk, an optical disk, a CD-ROM, a DVD disk, a RAM card, flash RAM, a RAM card, a PROM chip, or loaded over a network.

In the processing center 125 a variety of preparatory processes 130 may typically be applied via a general purpose computer 150, which might be a workstation, a mainframe computer, a parallel computer, multiple networked computers, etc. Within the processing center 125, additional processing of the data may take typically take place within a computer 150 (e.g., trace processing 130, creation of digitized zones of interest 160, computerized display of geophysical attributes 170) using standard and/or proprietary algorithms for processing seismic data 140. The output of such processing often takes the form of a 3-D data volume or 2-D section, attribute map 180 etc.

After conventional processing, which would in general include imaging processes such as migration or inversion, the resulting output image would then typically be displayed either at a high-resolution color computer monitor 170 or in hard-copy form as a printed seismic section or a map 180. The seismic interpreter would then use the displayed images to assist him or her in identifying subsurface features of interest, which might be features conducive to the generation, migration, or accumulation of hydrocarbons, time-lapse changes indicating movement of hydrocarbons or water floods, or might be possible geohazards requiring near-real-time monitoring.

As is generally noted in this figure and discussed in greater detail below, the restricted bandwidth communications link 121 between the data collection hub 120 and the processing center 125 can become a bottleneck in that the huge volumes of data that are generated by a prior art passive seismic survey recordings must be transmitted to a central processing facility via this link. This is the case shown in FIG. 1. Note that for purposes of the instant disclosure, the terms "restricted bandwidth link" or "restricted bandwidth communications link" may be a wireless or wired communications link. Further, given the size of the raw passive seismic data even a wired or optical link can, in some instances, be a bottleneck with respect to data transmission.

In some applications the limiting factor is not the data-transmission link, but data storage capacity in the processing center. In that case, the ability to store large amounts of digital data is the bottleneck, and the invention may instead be applied within the processing center to reduce the amount of data that needs to be stored, instead of in the field to reduce the amount of data that needs to be transmitted.

Turning now to some specifics of the instant invention, in the data-collection hub 120 initial processing may be performed as discussed hereinafter which may dramatically reduce the data volume as is described below. This pre-transmission processing may help reduce or eliminate the communications bottleneck between the field and the processing center.

By way of general background, it is well known to those of ordinary skill in the art that the autocorrelation of the response of a passive surface sensor to random sources/noise yields the reflectivity response of the earth. Additionally, it is also well known that cross correlating passive traces that have been recorded at two locations on the surface yields a seismic trace that contains a wavefield that is analogous to the wavefield that would be recorded at one of the locations if a seismic source were to be activated at the other.

Figure 3:
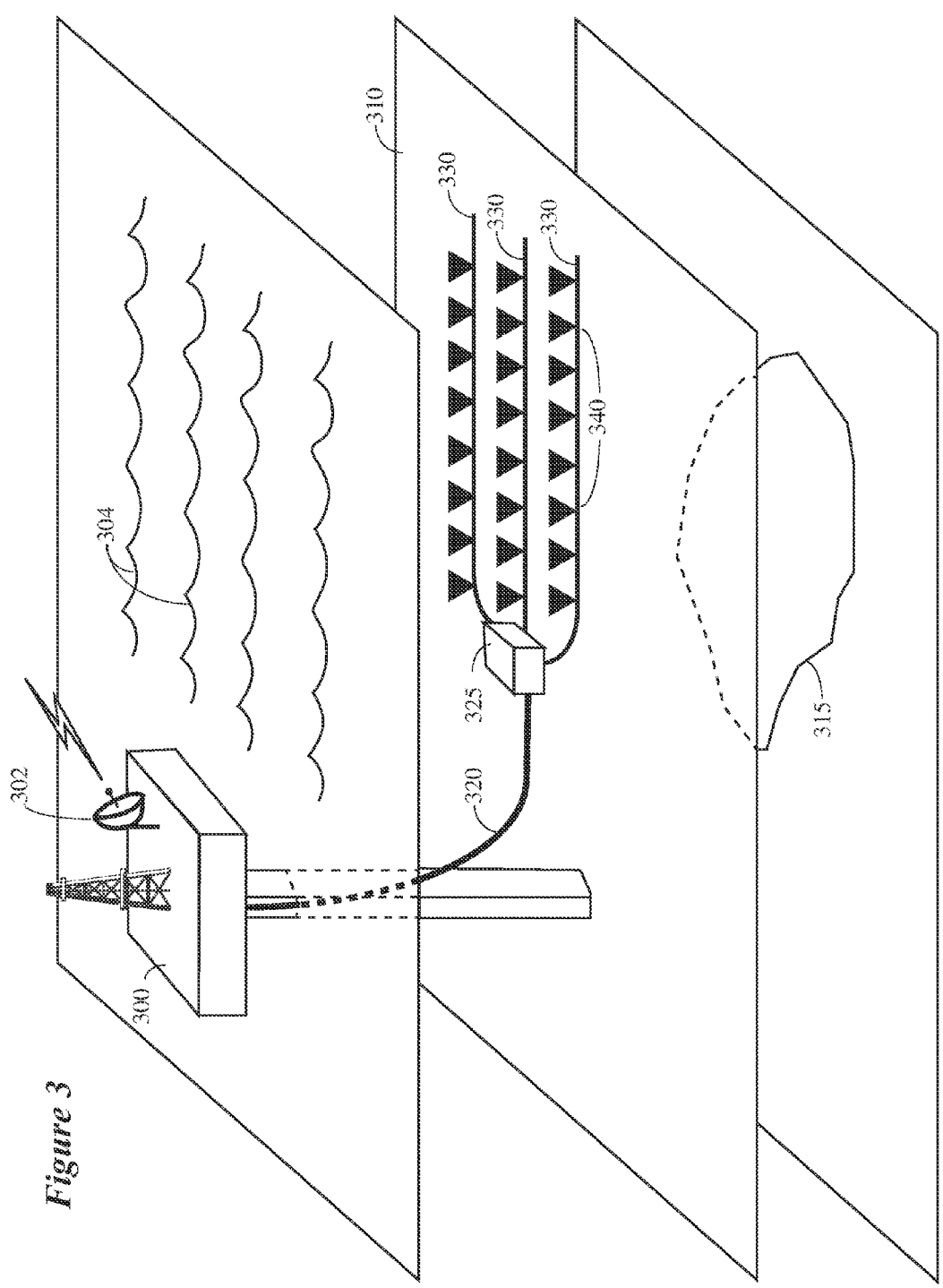
FIG. 3 illustrates an example marine field environment of the instant invention.

FIG. 3 illustrates one particular environment in which embodiments of the method could be used. Production platform 300 may contain a real-time data link via a cable 320 to a subsea junction box 325 which in turn connects to a subsea ocean-bottom cable array 330, which contains multiple ocean-bottom receivers 340 and that is positioned on the sea floor 310. The ocean-bottom array of this embodiment may be usable both for active seismic surveys and for passive seismic surveillance. The array may also include subsurface receivers, for example in boreholes (not shown). When used for passive seismic surveillance, waves 304 on the ocean surface 305 could provide at least a portion of the seismic source which illuminates a target of interest 315, for example shallow gas, which is located in the subsurface somewhere beneath or proximate to the ocean-bottom-cable array 330. On the platform 300 may be, in some embodiments, a communications link 302 (e.g., a satellite link) to an on-shore processing center. In this embodiment the communications link 302 represents a data bottleneck 121. In this example the data-collection hub 120 would likely be located on the platform 300.

After the receivers are in place, in an embodiment, continuously generated data from them may be accessed (step 200). In some embodiments, low-pass filtering may be performed (if desired) on the input data (step 210) to remove higher-frequencies that may likely not be useful for passive interferometry purposes. The data may then be divided into time portions (220 and 230), which in practice might be anywhere in length from a minute to several hours, depending on the application, sample rate, target, etc. At this point, the data may be examined and, if found not to be suitable, that portion of data may be abandoned 240. The data may then be converted into virtual-source seismic traces via cross correlation, or any other known technique for performing interferometry 250.

By way of example, step 250 might include selecting any two receivers and the passive seismic data recordings associated therewith and then cross correlating them to produce a single virtual seismic trace. Such an operation conceptually creates a virtual trace that has the same signal content as one that would have been recorded if a seismic source had been activated at one receiver and recorded at the other. As used herein, the terms "virtual source trace" or "virtual trace" should all be understood to mean a seismic trace that has been created from two (or more, in some cases) simultaneously recorded passive seismic traces by cross correlation or a similar procedure, such that the resulting signal content is conceptually the same as the content that would have been observed if a shot had been activated at one receiver and recorded at the other.

Additionally, directional distribution analysis might be performed on the data (if desired), and cross-correlation (or cross-deconvolution, or any of the other various methods in use) on streaming or buffered input data one time interval at a time, saving the desired outputs, and then discarding the original voluminous data. The computation may be performed in the field, either in the recording system itself or in a computer system located in the field. In an embodiment, the computer system may be located on a marine vessel such as without limitation, a boat or an offshore oil and gas platform. Alternatively, depending on the number of receivers and other factors this data reduction could alternatively be performed at a processing center with a real-time or a recurring transitory link to the field. For example, for offshore exploration targets the calculations might be performed in computers located on an adjacent platform, if one is available, or in a central processing facility on shore.

In some embodiments, the instant system may be automated to detect when the noise has desirable statistical properties, and avoid processing and saving data that would not be useful for later processing. This strategy could tremendously reduce the data overhead required to archive large amounts of virtual-source data, thereby making it feasible to do on a regular basis. It would be possible, for example, to calculate images derived from the virtual-source data like the ones above on a recurring and continuing basis, and examine these for changes. This would enable near-real-time surveillance of the field, for example to look for low-velocity anomalies such as those that would occur because of gas moving toward the surface. Note the arrays need not be ocean bottom cables, but might be, for example, positioned in a borehole or on land.

Also note that multicomponent data can be correlated in the field even if the required rotation matrices to pre-process the data are not yet known. Those of ordinary skill in the art will understand that conventionally the rotation matrices are determined from active-source data, and passive data are recorded, then rotated using the already-known matrices, and only then are the pre-processed data correlated to make virtual-source seismograms. However, by correlating as a first step, and saving the (substantially smaller) auto- and/or cross-correlations of the raw un-rotated components, the necessary rotation matrices can then be determined and applied later. Further, by using the virtual sources created by correlation in place of the traditional active sources, it will be possible to determine the necessary rotation matrices even if no active-source data are available.

Figure 2:
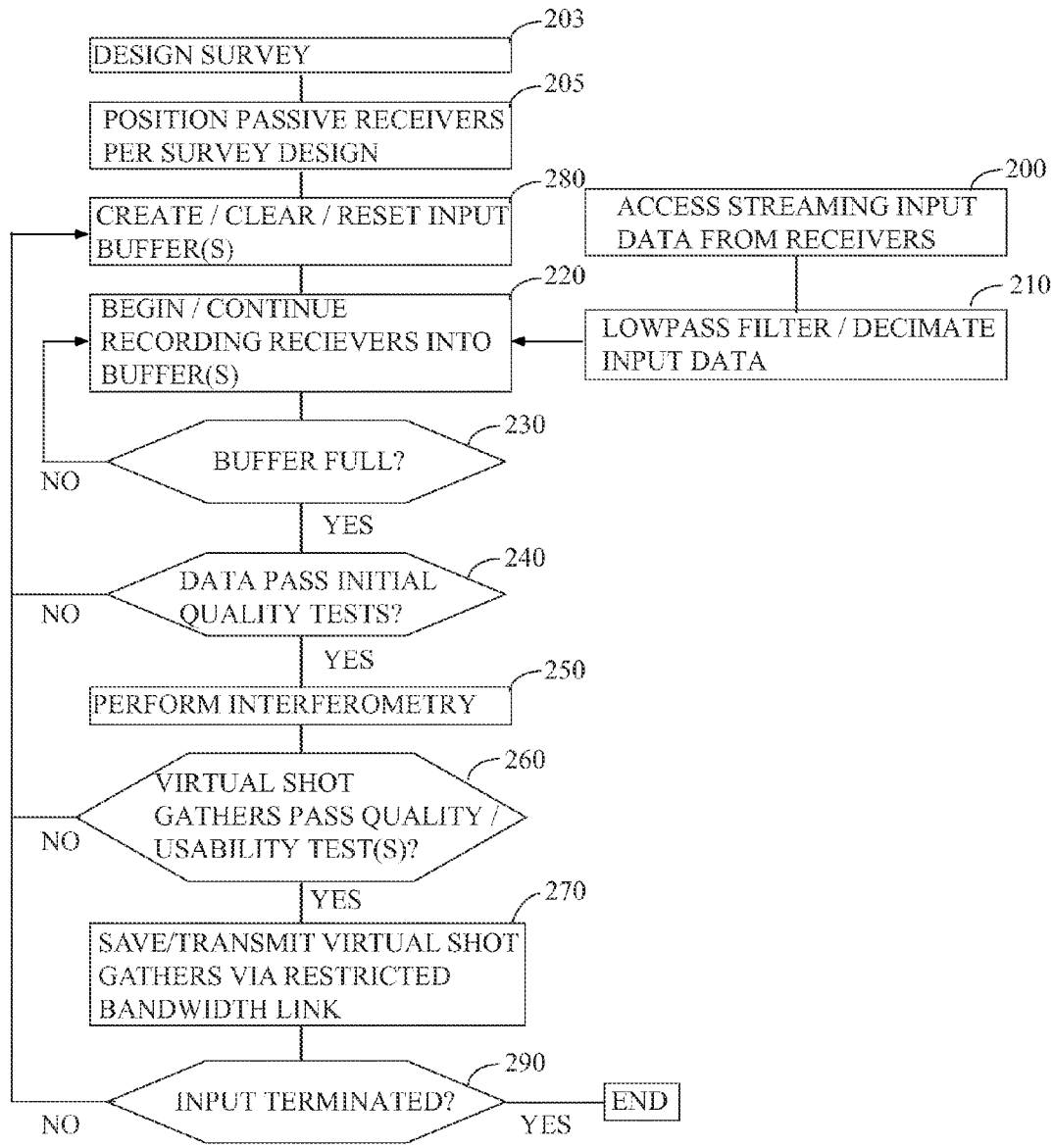
FIG. 2 contains an operating logic suitable for use with the instant invention.

In an embodiment of the invention and as is generally indicated in FIG. 2, a passive seismic survey may be designed according to any methods known to those of ordinary skill in the art (step 203). Included as part of the survey design may be specification of the placement of a plurality of receivers. In the field, the receivers may typically be positioned proximate to their designed locations. Next, passive seismic receivers may be positioned at least approximately pursuant to the survey design (step 205). The seismic receivers may be any seismic receivers known to those of skill in the art. FIG. 3 provides a schematic illustration of how a passive survey system might be configured in practice when the data are collected in a marine environment.

In step 200, the data stream from each of the receivers may be accessed and read. As has been explained elsewhere, in some cases the receivers may be streaming data for at least as long as the survey is taking place. Obviously, receivers that are left in the field at the end of the survey (e.g., OBS receivers) may continue to respond to passive and other signals but may not be recorded.

Next, in an embodiment a low pass filter may be applied to the data as a preface to decimating or otherwise reduce them in size (step 210). Note that this is contrary to the usual practice in the seismic exploration arts where the goal is to acquire high frequencies (e.g., use a low-cut filter), not to eliminate high frequencies and preserve low frequencies via a low-pass filter. In an embodiment, the data might be filtered to retain all frequencies below about 5 Hz. Of course, in some instances the upper limit might be somewhat higher (e.g., 10 Hz or so) and in some cases a lower frequency limit might also be applied to, e.g., filter out a DC signal.

Additionally, and in some embodiments, the data may be decimated after filtering. Those of ordinary skill in the art will recognize that one reason for utilizing a low-pass filter supra would be to reduce or eliminate aliasing that might be introduced by subsequent (or previous) decimation. In some cases, the data may be decimated by a factor of 50 for 2 mill data (i.e., only every $50^{th}$ sample may be kept), but, generally speaking, the amount of decimation could be between a factor of 10 and a factor of 100 for data of that sample rate. Those of ordinary skill in the art will recognize that the decimation factor that might be applied will vary depending on the sample rate of the passive data and the desired sample rate of the cross-correlated data. In addition, in some embodiments the data might also be examined for transient errors such as large data spikes, and these removed.

Next, one or more data input buffers may be created (280 in FIG. 2) to hold the recorded data. The input buffers need take no special form and merely need to be electronic storage of some sort (volatile or nonvolatile) that is suitable to receive the passive data as it is received. Those of ordinary skill in the art will understand that a "buffer" is just a section of volatile or non-volatile memory that is accessible by an attached computer, microprocessor, etc. For purposes of illustration only, the buffer(s) may be assumed to be at least large enough to hold one of the time-intervals of data referred to previously. Note that in an arrangement, these same buffers may be used in multiple passes through the algorithm of FIG. 2. In the event that step 280 is encountered in a second or later pass, it is anticipated that the buffer(s) may have previously been cleared (e.g., zeroed) or otherwise reset (e.g., a pointer might be changed to point to the first or other location in the buffer) in preparation for the acquisition of new input data. Alternatively, the contents of the data buffers might be archived and retained for a limited time interval such as a day or a week, allowing the uncorrelated data to be re-examined if the near-real-time processing reveals an interesting or unusual circumstance warranting further study. Note that, for purposes of the instant invention "near real time" may be broadly construed to include instances where the passive seismic data might be accumulated in real-time and stored locally for a brief period of time (e.g., a day or less) before being processed in the field according to the instant invention.

Recording may be continuous in some embodiments and continue for a substantial period of time. The recording may be performed for any suitable amount of time. In an embodiment, the recording may continue for at least one hour, or until a sufficient quantity of data have been collected to produce an image of the desired target of acceptable quality. In other embodiments, the time period for recording may range from about an hour to about 24 hours. Thus, the buffers of step 280 may be any arbitrarily large size.

In some embodiments, a test may be performed (decision item 230) periodically to determine whether or not the buffer(s) are full. If the one or more buffers are not full (the "NO" branch), the recording may continue until such time as the buffer(s) are full or the input has been terminated (step 290).

In the event that the buffer is full (i.e., the "YES" branch of decision item 230), an initial check may be made to see whether or not the recorded data pass a basic quality test (decision item 240). Although this quality test might take many forms, in some embodiments, the test may involve determining the probable distribution of the data, the apparent signal to noise ratio, the presence of high amplitude noise, etc. In other instances, the presence/absence of high amplitude transient or other noise, trace-to-trace coherency, etc., might all be used to judge the quality of the recorded data. In some instances, an observer on the seismic survey might manually include or exclude one or more traces. Note that this examination might be conducted before and/or after cross correlation as discussed below. If the data do not pass the initial quality test, in some embodiments the instant algorithm may branch back up to step 280 to acquire another data set, which in some embodiments may partially overlap with the data set from the time interval just considered.

In the event that the data are of an acceptable quality (i.e., the "YES" branch of decision item 240), the data from the plurality of receivers may be used to perform interferometry (step 250) according to methods well known to those of ordinary skill in the art. In more particular, auto correlations and/or cross correlations may be computed between the various traces to create virtual-source seismic traces as that term is known to those of ordinary skill in the art.

Next, the virtual-source seismic data that have been assembled during the previous step may be examined to determine whether or not they have sufficient quality to be usable for purposes of seismic exploration and/or monitoring. Among sorts of tests that might be applied include, without limitation, signal-to-noise ratio tests, trace-to-trace coherency tests, etc. The explorationist may typically have specified the criteria that are used to screen the seismic traces. Data that satisfy the criteria that might have been previously specified by the explorationist or seismic processor (i.e., the "YES" branch of decision item 260), the now much reduced in size virtual-source seismic data may be saved to nonvolatile storage and/or transmitted to a central processing facility for further treatment and use in exploration and/or monitoring. In some instances, data from two or more time intervals may be stacked together before transmission. On the other hand, if the data are not suitable for further use in exploration and/or monitoring, as before the buffer(s) that contain the data may be cleared or otherwise reset and new data stored therein.

If a trace is found to be useful in some sense, then the virtual-source gather(s) associated with that trace may be transmitted on to a processing center in real time over a data transmission link, and/or archived for later processing 270. The gathers might be stored pre-transmission or after reception, by way of example only, on hard disk, magnetic tape, magneto-optical disk, DVD disk, or other mass storage means. In either case, whether the limiting factor is data storage or data transmission rate, or both, the greatly reduced volume of data proceeds more easily through the limiting communications bottleneck 121.

Finally, if the seismic survey has reached its conclusion (i.e., the "YES" branch of decision item 290), the method may terminate. On the other hand, if more data is to be acquired, the algorithm of FIG. 2 may branch back to step 280 which may return the algorithm to its data input and processing mode. Of course, data that is obtained according to the instant invention may be utilized for any purpose that a conventional seismic trace might be utilized.

Note that in some cases a virtual source trace may be created by averaging together or otherwise combining one or more traces into a single trace (either before or after cross correlation). In that case, the resulting composite trace may be comparable to a trace that was obtained by activating a source at the geographic center of the receivers used in forming the summation as recorded by the data from the receiver that is cross correlated with the composite trace.

Those of ordinary skill in the art will recognize that, although a summation is one acceptable means of combining multiple traces into a single trace, any other measure of central tendency could potentially be utilized. For example, a median stack, trimmed mean stack, geometric mean stack, weighted stack, etc., could be used instead to combine the traces into a single representative trace. All that is required if measure of central tendency is applied is that the resulting trace represents in some sense a composite of the different individual cross correlations that are used to form it. As a consequence, when the terms "summation" or "accumulation" are used here, those terms should be understood to include instances where traditional, as well as non-traditional, measures of central tendency are employed.

Those of ordinary skill in the art will recognize that the cross correlation between two time series can also be described as the convolution of one time series with the time reverse of the other. Thus, when the term "cross correlation" is used herein, that language should be understood to also include time-reversed convolution and similar mathematical operations.

Further, in interpreting the term "correlation" herein, that term should be broadly construed to include cross correlation between two different traces as well as autocorrelation of a trace (i.e., cross correlation of a trace with itself). Thus, when it is said that a "pair" of traces is to be selected for purposes of correlation, that language should be understood to include instances where a single trace is selected for autocorrelation.

Finally, it should be noted that although the instant invention has been described principally in terms of an offshore embodiment, the instant method is suitable for application on land as well. On land, the receivers may be located either on or below the surface in an array over the area of interest, or in a borehole above, below, or proximate to the area of interest, or both. The receivers may communicate their data either in real time or via a recurring transient link, with the data passing through a wired, fiber-optic, or wireless communications link, or some combination of these.

CONCLUSIONS

By way of summary, it should be noted that the instant intention would allow for a tremendous reduction in the amount of data needing to be stored and handled in a passive seismic survey, in some cases a reduction in data volume by a factor of 200× to 3000× or more might be realized, depending on the size of the time-intervals used and how often they were sampled for processing.

In the foregoing, much of the discussion has been discussed largely in terms of passive marine seismic surveys, but that was done for purposes of illustration only and not out of an intent to limit the application of the instant invention to only marine surveys. Those of ordinary skill in the art will understand how the embodiments presented supra could readily be applied, by way of example, to 2D, 3D, 4D, etc., passive land surveys, marine surveys, down hole surveys, cross hole surveys, or any combination of same.

Further, although the embodiments have been discussed in terms of accumulating a time-interval of data and then auto-/cross-correlating the data within the time interval, those of ordinary skill in the art will recognize that cross and auto-correlation could alternatively be calculated in a streaming manner and then the correlation results divided into convenient time intervals as is discussed above.

Finally, the signals that are received by passive seismic sources should be understood to include natural sources such as ocean waves, earthquakes, etc., as well as sources such as man-made sources such as drill bit noise, buoys, ship propellers, etc. Conventional active seismic sources may also be used as a source of noise. In some cases, it might be desirable to add one or more artificial "random" signal sources such (in a marine environment) as two or more buoys that have been placed proximate to each other for that purpose and which are periodically driven together by wave action, thereby producing a random impulsive source. Another approach would be to use wave motion to raise a weight or pump up a tank with pressure and then release the energy as an impulsive source. If a large number of these devices were to be situated proximate to the survey, it is expected that the source energy produced thereby could contribute significantly to the quality of the resulting passive survey data. Needless to say, purposefully created ambient noise sources such as these could also prove to be useful in a 1-D survey (e.g., a virtual check shot survey), in a 2-D survey, in a 3-D survey, and/or in a time-lapse version of a 1-D, 2-D, 3-D, etc., survey.

While the inventive device has been described and illustrated herein by reference to certain embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A method of seismic surveillance above a region of the subsurface of the earth containing structural or stratigraphic features conducive to the presence, migration, or accumulation of hydrocarbons, comprising the steps of:
   (a) accessing a plurality of seismic receivers positioned proximate to the region of the subsurface of the earth;
   (b) continuously recording a passively acquired signal from each of said seismic receivers at a location proximate to said seismic receivers for a predetermined period of time, thereby obtaining a plurality of passive seismic recordings;
   (c) processing at least a portion of said passive seismic recordings to produce a plurality of virtual-source gathers, wherein said plurality of virtual source gathers have storage size that is less than a storage size of said at least a portion of said passive seismic recordings by a factor of at least 10;
   (d) processing at least a portion of said virtual source gathers to obtain an image representative of at least a portion of the region of the subsurface of the earth; and,
   (e) using at least a portion of said image to explore or monitor the region of the subsurface of the earth.

2. The method according to claim 1, wherein step (c) comprises the step calculating a cross correlation between a plurality of two different ones of said passive seismic recordings, thereby producing said virtual-source seismic gathers.

3. The method according to claim 1, wherein step (e) comprises using at least a portion of said image to explore or monitor the region of the subsurface of the earth for changes in seismic wave propagation speeds or changes in polarizations.

4. The method according to claim 1, wherein step (e) comprises using at least a portion of said image to explore or monitor the region of the subsurface of the earth for hydrocarbons.

5. The method according to claim 1, wherein step (c) comprises processing at least a portion of said plurality of passive seismic recordings at a location proximate to the seismic receivers to produce a plurality of virtual source gathers, wherein said plurality of virtual-source gathers have a storage size that is less than a storage size of said portion of said passive seismic recordings by a factor of at least 10.

6. The method according to claim 5 wherein the location proximate to said seismic receivers is a marine vessel located proximate to said seismic receivers.

7. The method according to claim 1, further comprising transmitting at least a portion of said plurality of virtual-source gathers to a remote facility prior to step (d).

8. The method according to claim 7, wherein transmitting the portion of said plurality of virtual-source gathers to said remote facility comprises the step of wirelessly transmitting the portion of said plurality of virtual-source gathers to said remote facility.

9. The method according to claim 1, wherein step (c) comprises processing at least a portion of said plurality of passive seismic recordings at a remote processing facility to produce a plurality of virtual source gathers, wherein said plurality of virtual-source gathers have a storage size that is reduced relative to a storage size of said portion of said passive seismic recordings by a factor of at least 10.

10. The method according to claim 1, further comprising performing step (c) near real time.

11. The method of claim 1, wherein condensing the size of the virtual source gathers includes low pass filtering the virtual source gathers below 10 Hz and decimating the low pass filtered virtual source gathers by a factor of at least 10.

12. The method according to claim 11, further comprising transmitting at least a portion of said processed plurality of seismic recordings to the remote processing facility via a restricted bandwidth communications link prior to performing step (c).

13. A method of seismic surveillance, wherein is provided a plurality of seismic receivers situated proximate a subsurface target of exploration or surveillance interest, comprising the steps of:
   (a) continuously recording a passively acquired signal from each of said plurality of seismic receivers for a predetermined period of time, thereby obtaining a plurality of passive seismic recordings;
   (b) in a computer,
      processing said plurality of seismic recordings to reduce a storage size of said processed plurality of seismic recordings as compared with a storage size of said plurality of seismic recordings by a factor of at least 10,
   (c) within a remote processing facility, further processing at least a portion of said transmitted processed seismic recordings to obtain an image representative of at least a portion of the subsurface target; and,
   (d) using at least a portion of said image to explore or monitor the region of the subsurface of the earth.

14. The method according to claim 13, wherein said restricted bandwidth communications link is selected from a group consisting of a wireless link, a wired link, and a fiber-optic communications link.

15. The method according to claim 13, wherein step (c) comprises the steps of:
   (c1) within said remote processing facility further processing at least a portion of said transmitted processed seismic recordings by calculating a cross correlation between a plurality of two different ones of said transmitted processed seismic recordings, thereby producing a plurality of virtual source seismic traces, and
   (c2) using said plurality of virtual source seismic traces to obtain said image representative of at least a portion of said subsurface target.

16. The method according to claim 13, wherein the processing in near real time comprises low-pass filtering each of said plurality of seismic recordings and decimating each of said plurality of seismic recordings, thereby reducing a storage size of said filtered and decimated plurality of seismic recordings as compared with the storage size of said plurality of seismic recordings by a factor of at least 10.

17. The method according to claim 13, wherein step (d) comprises using at least a portion of said image to explore or monitor the region of the subsurface of the earth for changes in seismic wave propagation speeds or polarizations.

18. The method according to claim 13, wherein step (d) comprises using at least a portion of said image to explore or monitor the region of the subsurface of the earth for hydrocarbons.

19. The method according to claim 13, further comprising transmitting at least a portion of said processed plurality of seismic recordings to the remote processing facility via a restricted bandwidth communications link prior to performing step (c).

20. A method of seismic surveillance above a region of the subsurface of the earth containing structural or stratigraphic features conducive to the presence, migration, or accumulation of hydrocarbons, comprising the steps of:
  (a) accessing a plurality of seismic receivers positioned proximate to the region of the subsurface of the earth;
  (b) at a location proximate to said plurality of receivers,
    (b1) continuously recording a signal from each of said plurality of seismic receivers for a predetermined period of time, thereby obtaining a plurality of seismic recordings, and,
    (b2) applying a low-pass filter to each of said plurality of seismic recordings and decimating each of said plurality of seismic recordings by a factor of at least 10, thereby producing a plurality of processed seismic traces;
  (c) transmitting at least a portion of said plurality of processed seismic traces to a remote processing facility;
  (d) within said remote processing facility, further processing at least a portion of said plurality of processed seismic traces to obtain an image representative of at least a portion of the region of the subsurface of the earth; and,
  (e) using at least a portion of said image to explore or monitor the region of the subsurface of the earth.

21. The method of seismic surveillance according to claim 20, wherein step (b2) comprises the step of:
  (b2) applying a 10 Hz or lower low-pass filter to each of said plurality of seismic recordings and decimating each of said plurality of seismic recordings by a predetermined factor, thereby producing a plurality of processed seismic traces.

22. The method according to claim 20, wherein step (b2) comprises the steps of:
  (i) applying a low-pass filter to each of said plurality of seismic recordings and decimating each of said plurality of seismic recordings by a predetermined factor, thereby producing a plurality of filtered and decimated seismic recordings,
  (ii) choosing a plurality of pairs of said plurality of filtered and decimated seismic recordings, and,
  (iii) calculating a cross correlation of each of said chosen plurality of pairs of filtered and decimated seismic recordings, thereby producing a plurality of processed seismic traces.

23. The method according to claim 20, wherein step (e) further comprises using at least a portion of said image to explore or monitor the region of the subsurface of the earth for changes in seismic wave propagation speeds or polarizations.

24. The method according to claim 20, wherein step (e) further comprises using at least a portion of said image to explore or monitor the region of the subsurface of the earth for hydrocarbons.

25. The method according to claim 20, wherein each of said seismic receivers is a marine seismic receiver and the location proximate to said plurality of said seismic receivers is an offshore location proximate to said plurality of seismic receivers.

26. A method of seismic surveillance above a region of the subsurface of the earth containing structural or stratigraphic features conducive to the presence, migration, or accumulation of hydrocarbons, comprising the steps of:
  (a) within a processing facility remote from the region of the subsurface of the earth, accessing a plurality of processed seismic traces that have been collected by the steps of:
    (a1) positioning a plurality of passive seismic receivers proximate to the region of the subsurface of the earth,
    (a2) continuously recording a signal from each of said plurality of passive seismic receivers for a predetermined period of time, thereby obtaining a plurality of passive seismic recordings,
    (a3) at a location proximate to said plurality of passive seismic receivers,
      (i) applying a low-pass filter to each of said plurality of passive seismic recordings and decimating each of said plurality of passive seismic recordings by a factor of at least 10, thereby producing a plurality of modified passive seismic traces,
      (ii) selecting at least one pair of modified passive seismic traces,
      (iii) calculating a correlation of each of said selected at least one pair of modified passive seismic traces, thereby producing said plurality of processed seismic traces, and,
      (iv) transmitting said plurality of processed seismic traces from the location proximate to the plurality of passive seismic receivers to the processing facility remote from the region of the subsurface of the earth;
  (b) using at least a portion of said accessed plurality of seismic traces to obtain an image representative of at least a portion of the region of the subsurface of the earth; and,
  (c) using at least a portion of said image to explore or monitor the region of the subsurface of the earth.

27. The method according to claim 26, wherein step (c) comprises using at least a portion of said image to explore or monitor the region of the subsurface of the earth for changes in seismic wave propagation speeds or polarizations.

28. The method according to claim 26, wherein step (c) comprises using at least a portion of said image to explore or monitor the region of the subsurface of the earth for hydrocarbons.

29. A method of seismic surveillance above a region of the subsurface of the earth containing structural or stratigraphic features conducive to the presence, migration, or accumulation of hydrocarbons, comprising the steps of:
  (a) within a processing center remote from the region of the subsurface of the earth, accessing a plurality of decimated and filtered passive seismic traces that have been collected by the steps of:
    (a1) positioning a plurality of passive seismic receivers proximate to the region of the subsurface of the earth;
    (a2) continuously recording a signal from each of said plurality of passive seismic receivers for a predetermined period of time, thereby obtaining a plurality of passive seismic traces,
    (a3) applying a low pass filter to each of said plurality of passive seismic traces, (a4) decimating by a factor of at least 10 each of said plurality of passive seismic traces, thereby producing a plurality of decimated and filtered passive seismic traces, and, (a5) transmitting said plurality of decimated and filtered passive seismic traces from a location proximate to the region of the subsurface of the earth to said remote processing facility;

(b) using at least a portion of said accessed decimated and filtered passive seismic traces to obtain an image representative of at least a portion of the region of the subsurface of the earth; and, (c) using at least a portion of said image to explore or monitor the region of the subsurface of the earth.

30. The method according to claim 29, wherein step (c) comprises using at least a portion of said image to explore or monitor the subsurface of the earth for changes in seismic wave propagation speeds or polarizations.

31. The method according to claim 29, wherein step (c) comprises using at least a portion of said image to explore or monitor the region of the subsurface of the earth for hydrocarbons.

32. A method, comprising:

continuously recording a plurality of passively acquired seismic signals for a predetermined period of time, thereby obtaining a plurality of passive seismic recordings representative of a region of the subsurface of the earth;

processing at least a portion of the passive seismic recordings to produce a plurality of virtual-source gathers, wherein the virtual source gathers have a storage size less than a storage size of the portion by a factor of at least 10 and the processing includes:

performing a process on the portion one recording-time period at a time for a plurality of recording-time periods;

saving a plurality of desired outputs of the performed process; and discarding the processed portion;

processing at least a portion of the virtual source gathers to obtain an image representative of at least a portion of the region of the subsurface of the earth; and using at least a portion of said image to explore or monitor the region of the subsurface of the earth.

33. The method of claim 32, wherein the performed process includes as least one of low-pass filtering and decimation, directional distribution analysis, frequency-band analysis, and a virtual-source interferometry technique.

34. The method of claim 32, wherein processing the portion of the passive seismic recordings is performed prior to transmitting the virtual source gathers to a remote processing facility to process the portion of the virtual source gathers.

* * * * *